Dec. 9, 1952 V. LUNDELL Re. 23,594

TRAILER DUMP BODY

Original Filed Jan. 8, 1946 2 SHEETS—SHEET 1

INVENTOR.
Vernon Lundell
BY Sam J. Slotky
ATTORNEY

TRAILER DUMP BODY

Original Filed Jan. 8, 1946 2 SHEETS—SHEET 2

INVENTOR.
Vernon Lundell
BY Sam J. Slotky
ATTORNEY

Reissued Dec. 9, 1952

Re. 23,594

UNITED STATES PATENT OFFICE 23,594

TRAILER DUMP BODY

Vernon Lundell, Meriden, Iowa

Original No. 2,507,169, dated May 9, 1950, Serial No. 639,835, January 8, 1946. Application for reissue October 2, 1950, Serial No. 188,019

2 Claims. (Cl. 298—22)

Matter enclosed in heavy brackets [ ] appears in the original patent but forms no part of this reissue specification; matter printed in italics indicates the additions made by reissue.

The invention as described herein and illustrated in the accompanying drawings, consists of a trailer, an object of which is to provide a dump body on a trailer chassis.

Another object of the invention is to provide a hydraulic dump for a trailer body.

A further object of this invention is to provide a truck body pivotally connected to a trailer chassis and an inclined trackway depending from the body through means of which the body may be raised and dumped of its load.

A still further object of the invention is the provision of means whereby a trailer body may be hydraulically raised to dumping position and gravity means for lowering the same, said hydraulic means acting to retard too rapid a down movement.

Other features and advantages will become more readily apparent from the following description and the accompanying illustrative drawings, in which.

Figure 1:
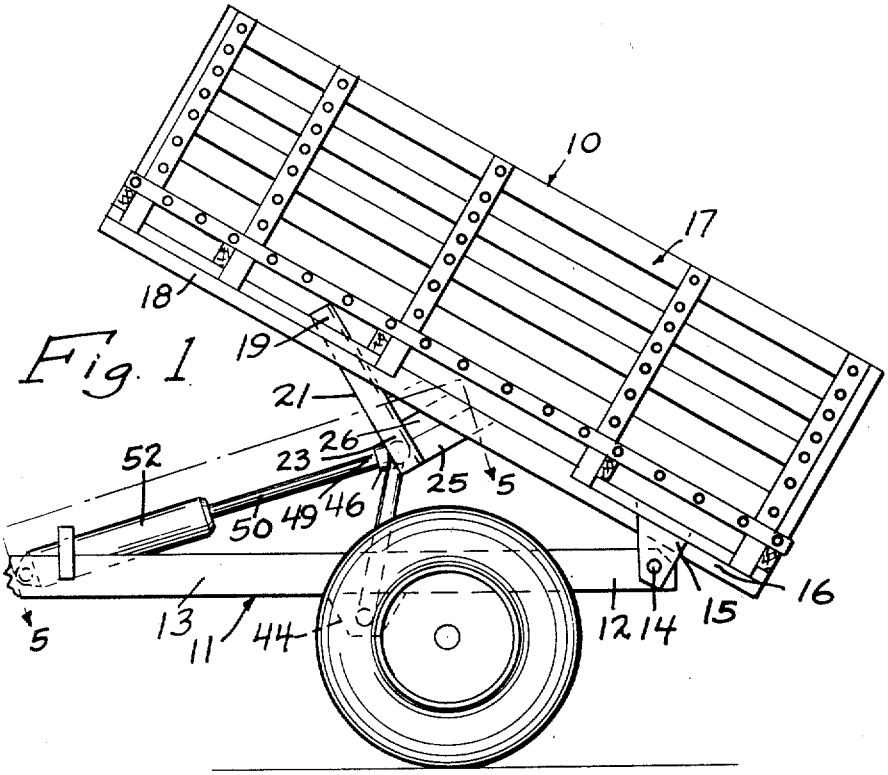
Figure 1 is an elevational view of the dump trailer shown in dumping position.
Figure 2:
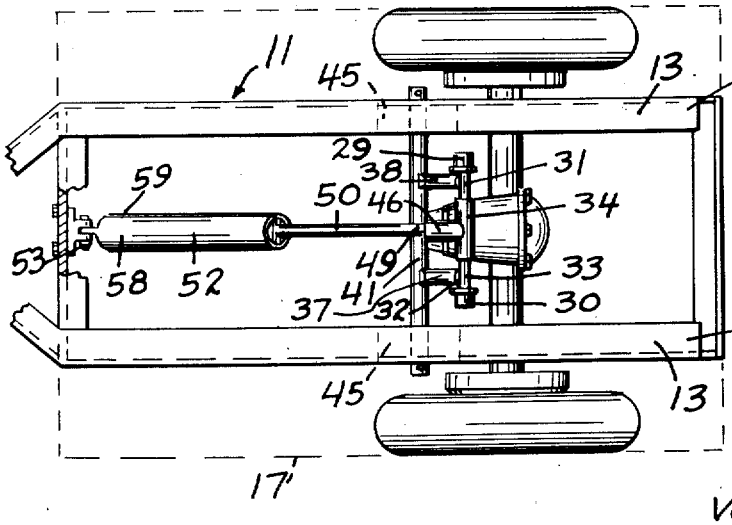
Figure 2 is a bottom plan view thereof.
Figure 3:
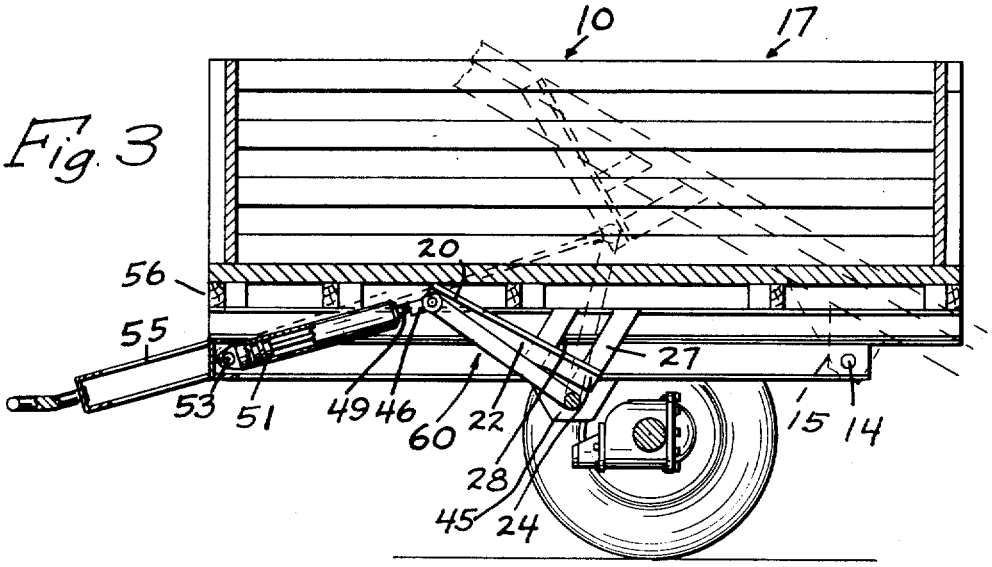
Figure 3 is a longitudinal sectional view thereof shown in normal position.
Figure 5:
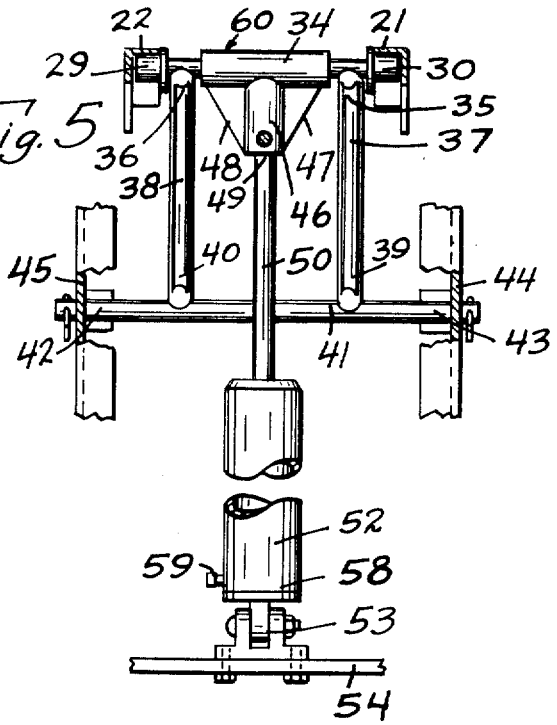
Figure 5 is a plan view as seen from line 5—5 of Figure 1.
Figure 4:
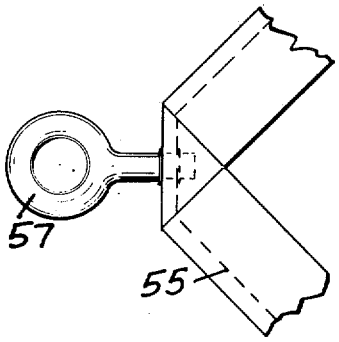
Figure 4 is a detail of a hitch.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout and in which the numeral 10, refers to the invention in its entirety and 11, indicates a trailer chassis [to] *with* the rear terminals 12, of the side irons 13, *on* which are pivotally mounted at at 14, the depending bearings 15, *said bearings* being fixed to the rear portion 16, of a truck body 17.

Fixedly mounted to the underside 18, of the body are the upper ends 19 and 20, of a pair of track members 21 and 22, which incline down in a rearward direction, the lower ends 23 and 24, of which are held fixed by braces 25, 26, 27 and 28. Operating upon said tracks 21 and 22, are wheels 29 and 30, rotatable on the ends 31 and 32, of a shaft 33, upon which is mounted a tube 34, within which the shaft 33, is rotatable. The ends 31 and 32, are supported upon the upper ends 35 and 36, of arms 37 and 38, the lower ends 39 and 40, of which are fixed to a transverse bar 41, the ends 42 and 43, of the bar being pivotally mounted in bearings 44 and 45, depending from said chassis.

The tube 34, is provided with a centered extension 46, braced by fins 47 and 48, and into which the end 49, of a piston rod 50, is fixed. The rod 50, is actuated by a piston 51, within the cylinder 52, [fixedly] *pivotally* secured at 53, to the cross iron 54, of the chassis 11. A draw bar 55, is fixed to the forward end 56, of the chassis and to which is attached an eye 57, whereby the trailer may be attached to a truck or tractor.

From the above specification it will be seen that through forcing fluid into the end 58, of the cylinder 52, through port 59, connected in any suitable manner to a pressure source, the shaft 33, of the lift 60, will be forced up causing wheels 29 and 30, to ride tracks 21 and 22, which action will push the body 17, up to its dumping position as shown in Figure 1 of the drawings. Upon release of pressure in the lower end of the cylinder the weight of the truck body will cause it to lower by gravity as the fluid escapes.

From the foregoing specification it will become apparent that the invention disclosed will adequately accomplish the functions for which it has been designed and in an economical manner, and that its simplicity, accuracy and ease of operation are such as to provide a relatively inexpensive device considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described the invention, that which is claimed to be new and desired to be procured by Letters Patent is:

[1. In a trailer chassis having a pair of spaced longitudinal side members interconnected by a transverse bar at their forward ends, a hoisting mechanism comprising a body hinged to the forward ends of said side members, a hydraulic lift comprising a cylinder pivoted to said transverse bar, a piston in said cylinder having a piston rod extending therefrom, inclined tracks depending from said body and located between the pivots of said body and said cylinder, an axle carried by the outer end of said piston rod, wheels on said axle engaging said tracks, a transverse bar rotatably journalled on the underside of said side members between the pivots of said body and said cylinder, and spaced arms terminally secured to said transverse bar and said axle.]

[2. The combination of claim 1 wherein said tracks are inclined downwardly and rearwardly of said body relative to said hydraulic lift.]

*3. In a trailer chassis having a pair of spaced longitudinal side members, a transverse bar connecting said side members, a hoisting structure comprising a box-like body hinged to the rear ends of said side members, a hydraulic lift including a cylinder pivoted to said transverse bar, a piston in said cylinder having a piston rod extending therefrom, tracks attached to said body, a further transverse bar attached to the outer end of said piston rod, wheels journalled on said further transverse bar and engaging said tracks, spaced supporting arms pivotally secured to said side members and pivotally attached to said further transverse bar, said tracks being inclined toward the rear ends of said side members, the complete length of said inclined tracks being positioned between the hinged point of said body and the rear end of said cylinder, whereby the pivoting point of said cylinder and said piston will be ahead of said tracks at all times during the raising action imparted by said cylinder.*

*4. In a trailer chassis having a substantially rectangular stationary framework portion, a hoisting structure comprising a box-like body hinged to the rear end of said framework portion, a hydraulic lift including a cylinder pivoted to the forward end of said framework portion, a piston in said cylinder having a piston rod extending therefrom, tracks attached to said body, a transverse bar attached to the outer end of said piston rod, wheels journalled on said transverse bar and engaging said tracks, spaced supporting arms pivotally secured to the sides of said framework portion and pivotally attached to said transverse bar, said tracks being inclined toward the rear end of said framework portion, the complete length of said inclined tracks being positioned between the hinged point of said body and the rear end of said cylinder, whereby the pivoting point of said cylinder and said piston will be ahead of said tracks at all times during the raising action imparted by said cylinder.*

VERNON LUNDELL.

REFERENCES CITED

The following references are of record in the file of this patent or the original patent:

UNITED STATES PATENTS

| Number | Name | Date |
|---|---|---|
| 1,693,874 | Sirot | Dec. 4, 1928 |
| 1,889,520 | Anthony | Nov. 29, 1932 |
| 1,943,050 | Beath | Jan. 9, 1934 |
| 1,944,414 | Eisenberg, Jr. | Jan. 23, 1934 |
| 2,144,599 | Anthony | Jan. 17, 1939 |
| 2,162,831 | Barrett | June 20, 1939 |
| 2,210,142 | Day | Aug. 6, 1940 |
| 2,488,790 | Wood | Nov. 22, 1949 |

FOREIGN PATENTS

| Number | Country | Date |
|---|---|---|
| 122,256 | Australia | Sept. 11, 1946 |